United States Patent
Hirayama et al.

(10) Patent No.: US 10,391,890 B2
(45) Date of Patent: Aug. 27, 2019

(54) VEHICLE SEAT CONTROL SYSTEM, VEHICLE SEAT CONTROL METHOD, AND STORAGE MEDIUM

(71) Applicant: HONDA MOTOR CO., LTD., Minato-ku, Tokyo (JP)

(72) Inventors: Kenta Hirayama, Shioya-gun (JP); Hajime Ishihara, Utsunomiya (JP); Manabu Matsumoto, Utsunomiya (JP); Muneatsu Minato, Utsunomiya (JP); Yosuke Nishimura, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/884,446

(22) Filed: Jan. 31, 2018

(65) Prior Publication Data

US 2018/0222350 A1 Aug. 9, 2018

(30) Foreign Application Priority Data

Feb. 7, 2017 (JP) ................................. 2017-020171

(51) Int. Cl.
*B60N 2/02* (2006.01)
*B60N 2/16* (2006.01)
(Continued)

(52) U.S. Cl.
CPC ........... *B60N 2/0244* (2013.01); *B60N 2/162* (2013.01); *B60N 2/2222* (2013.01); *B60N 2/995* (2018.02); *B60N 2002/0272* (2013.01)

(58) Field of Classification Search
CPC ........ B60N 2/044; B60N 2/995; B60N 2/162; B60N 2002/0272
(Continued)

(56) References Cited

U.S. PATENT DOCUMENTS

| 2008/0272637 | A1* | 11/2008 | Czinki | B60N 2/0224 |
| | | | | 297/301.5 |
| 2013/0175838 | A1* | 7/2013 | Oshima | B60N 2/4228 |
| | | | | 297/284.3 |
| 2014/0077560 | A1* | 3/2014 | Hirao | B60N 2/0232 |
| | | | | 297/354.11 |

FOREIGN PATENT DOCUMENTS

| JP | 05-085234 | 4/1993 |
| JP | 05-330368 | 12/1993 |
(Continued)

OTHER PUBLICATIONS

Japanese Notice of Allowance for Japanese Patent Application No. 2017-020171 dated Sep. 18, 2018.

*Primary Examiner* — Marthe Y Marc-Coleman
(74) *Attorney, Agent, or Firm* — Amin, Turocy & Watson LLP

(57) ABSTRACT

A vehicle seat control system (1) includes a first backrest portion (302) rotatably connected to a seating portion (301) by a first connection unit (308), a second backrest portion (302) rotatably connected to the first backrest portion by a second connection unit (309), a folding adjustment unit (304) that adjusts an angle of the second connection unit, a seat surface adjustment unit (304) that adjusts a height of the seating portion, a first angle detection unit (308*a*) that detects a first angle that is formed between the first backrest portion and a floor surface, a second angle detection unit (309*a*) that detects a second angle that is formed between the second backrest portion and the first backrest portion, and a control unit (160) that controls the folding adjustment unit on the basis of the first angle at the time of automatic driving of the vehicle to adjust the second angle, and controls the seat surface adjustment unit to maintain a height of a reference position in the second backrest portion to be equal to or greater than a reference height in a case that the height (Continued)

of the reference position in the second backrest portion is smaller than the reference height.

7 Claims, 15 Drawing Sheets

(51) Int. Cl.
*B60N 2/90* (2018.01)
*B60N 2/22* (2006.01)

(58) Field of Classification Search
USPC .......................................................... 701/49
See application file for complete search history.

(56) References Cited

FOREIGN PATENT DOCUMENTS

| | | |
|---|---|---|
| JP | 07-069107 | 3/1995 |
| JP | 09-048265 | 2/1997 |
| JP | 2007-245831 | 9/2007 |
| JP | 2007-253664 | 10/2007 |
| JP | 2010-069917 | 4/2010 |
| JP | 4534624 | 9/2010 |
| JP | 2014-201174 | 10/2014 |
| WO | 2012/157321 | 11/2012 |
| WO | 2016/049351 | 3/2016 |

\* cited by examiner

VEHICLE SEAT CONTROL SYSTEM, VEHICLE SEAT CONTROL METHOD, AND STORAGE MEDIUM

CROSS-REFERENCE TO RELATED APPLICATION

Priority is claimed on Japanese Patent Application No. 2017-020171 filed Feb. 7, 2017, the content of which is incorporated herein by reference.

BACKGROUND

Field of the Invention

The present invention relates to a vehicle seat control system, a vehicle seat control method, and a storage medium.

Description of Related Art

In the related art, a vehicle seat device including a lower backrest portion and an upper backrest portion into which a backrest portion is divided as upper and lower parts, a driving means for independently tilting the lower backrest portion and the upper backrest portion, and a seat cushion driving means for at least vertically moving a seat cushion of a seat surface is disclosed (for example, refer to Japanese Patent No. 4534624). In this vehicle seat device, in a case that the lower backrest portion is tilted, the seat cushion of the seat surface is raised with an increase in a folding angle between the lower backrest portion and the upper backrest portion so that the folding angle increases in a state in which an angle of the upper backrest portion with respect to a floor surface is maintained constant.

SUMMARY

In recent years, technologies for controlling a position of a seat on which an occupant is seated on the basis of a traveling state of a vehicle have been under research. In addition, implementation of automatic driving is under way. In a case that a vehicle is in an automatic driving mode, a driver may cause the seat to enter a reclining state, and take a relaxing posture. However, even in a case that the vehicle is in the automatic driving mode, the driver may be required to monitor safety according to an automatic driving level, and therefore, even in a case that the seat is in the reclining state, it is necessary to secure a front field of vision of the driver.

However, in the related art, control for securing the field of vision of the driver has not been performed according to a change in a driving mode of the vehicle.

Aspects of the present invention have been made in view of such circumstances, and an object of the present invention is to provide a vehicle seat control system, a vehicle seat control method, and a storage medium capable of securing a field of vision of a driver according to a change in a driving mode of a vehicle.

A vehicle seat control system, a vehicle seat control method, and a storage medium according to the present invention adopt the following configurations.

(1) An aspect of the present invention is a vehicle seat control system that is mounted on a vehicle, the vehicle seat control system including: a first backrest portion rotatably connected to a seating portion by a first connection unit; a second backrest portion rotatably connected to the first backrest portion by a second connection unit; a folding adjustment unit that adjusts an angle of the second connection unit; a seat surface adjustment unit that adjusts a height of the seating portion; a first angle detection unit that detects a first angle that is formed between the first backrest portion and a floor surface; a second angle detection unit that detects a second angle that is formed between the second backrest portion and the first backrest portion; and a control unit that controls the folding adjustment unit on the basis of the first angle detected by the first angle detection unit at the time of automatic driving of the vehicle to adjust the second angle, and controls the seat surface adjustment unit to maintain a height of a reference position in the second backrest portion to be equal to or greater than a reference height in a case that the height of the reference position in the second backrest portion is smaller than the reference height.

(2) In the aspect (1), the reference position of the second backrest portion is a position of an upper end of the second backrest portion, and the reference height is set between the height of the reference position at the time of manual driving and a height of a lower end of a front window of the vehicle.

(3) In the aspect (1), the vehicle seat control system further includes a rotation angle restriction unit that restricts a rotation angle of the first connection unit, wherein, in a case that a position of an upper end of the second backrest portion is smaller than the reference height at a limit value of an adjustment range of the height of the seat surface adjustment unit, the control unit controls the rotation angle restriction unit to restrict the rotation angle of the first connection unit.

(4) In the aspect (3), in a case in which the rotation angle of the first connection unit is increased to exceed a threshold value of a condition that the height of the reference position be smaller than the reference height even in a case that the control unit performs control up to a limit value of a rotation angle of the second backrest portion relative to the first backrest portion and a limit value of an adjustment range of a height of the seat surface adjustment unit, the control unit controls the rotation angle restriction unit to restrict the rotation angle of the first connection unit.

(5) In the aspect (1), the vehicle seat control system further includes: a leg support portion that is rotatably connected to the seating portion by a third connection unit and supports leg portions of an occupant; and a leg support adjustment unit that adjusts a third angle that is formed between the leg support portion and the seating portion, wherein the control unit controls the leg support adjustment unit while interlocking with the control of the seat surface adjustment unit.

(6) A method of controlling a vehicle seat according to an aspect of the present invention is a method of controlling a vehicle seat including a first backrest portion rotatably connected to a seating portion by a first connection unit, a second backrest portion rotatably connected to the first backrest portion by a second connection unit, a folding adjustment unit that adjusts an angle of the second connection unit, and a seat surface adjustment unit that adjusts a height of the seating portion, the method using an in-vehicle computer, comprising: detecting a first angle that is formed between the first backrest portion and a floor surface, detecting a second angle that is formed between the second backrest portion and the first backrest portion, and controlling the folding adjustment unit on the basis of the detected first angle at the time of automatic driving of the vehicle to adjust the second angle, and controls the seat surface adjustment unit to maintain a height of a reference position in the second backrest portion to be equal to or greater than a reference height in a case that the height of the reference position in the second backrest portion is smaller than the reference height.

(7) An aspect of the present invention is a non-transitory computer-readable recording medium recording a program for controlling a vehicle seat including a first backrest portion rotatably connected to a seating portion by a first connection unit, a second backrest portion rotatably connected to the first backrest portion by a second connection unit, a folding adjustment unit that adjusts an angle of the second connection unit, and a seat surface adjustment unit that adjusts a height of the seating portion, the program causing an in-vehicle computer to: detect a first angle that is formed between the first backrest portion and a floor surface, detect a second angle that is formed between the second backrest portion and the first backrest portion, control the folding adjustment unit on the basis of the detected first angle at the time of automatic driving of the vehicle to adjust the second angle, and control the seat surface adjustment unit to maintain a height of a reference position in the second backrest portion to be equal to or greater than a reference height in a case that the height of the reference position in the second backrest portion is smaller than the reference height.

According to (1), (6), and (7), even in a case that the driver causes the seat to enter a reclining state at the time of automatic driving of the vehicle, it is possible to secure the field of vision of the driver and improve safety at the time of automatic driving.

According to (2), even in a case that the driver causes the seat to enter a reclining state during automatic driving of the vehicle, it is possible to adjust the height of the seat in a range in which the field of vision of the driver can be secured in the vehicle, and improve safety at the time of automatic driving.

According to (3) and (4), by restricting the rotation angle of the first connection unit using the rotation angle restriction unit before the field of vision of the driver cannot be secured even in a case that the seat surface adjustment unit is adjusted to a height of a limit value of the adjustment range, it is possible to reliably ensure the field of vision of the driver and improve safety at the time of automatic driving.

According to (5), it is possible to prevent the leg portions of the driver from being separated from the floor surface according to the adjustment of the seat surface adjustment unit, and to reduce fatigue of the driver and improve safety at the time of automatic driving.

DESCRIPTION OF EMBODIMENTS

Hereinafter, embodiments of a vehicle system, a vehicle control method, and a storage medium of the present invention will be described with reference to the drawings. The vehicle system is applied to an automatically driven vehicle. Automatic driving to be described below is assumed to be automatic driving at a level at which an occupant is obliged to pay attention to the surroundings, rather than fully automatic driving in which the occupant is not obliged to pay attention to the surroundings.

First Embodiment

[Overall Structure]

Figure 1:
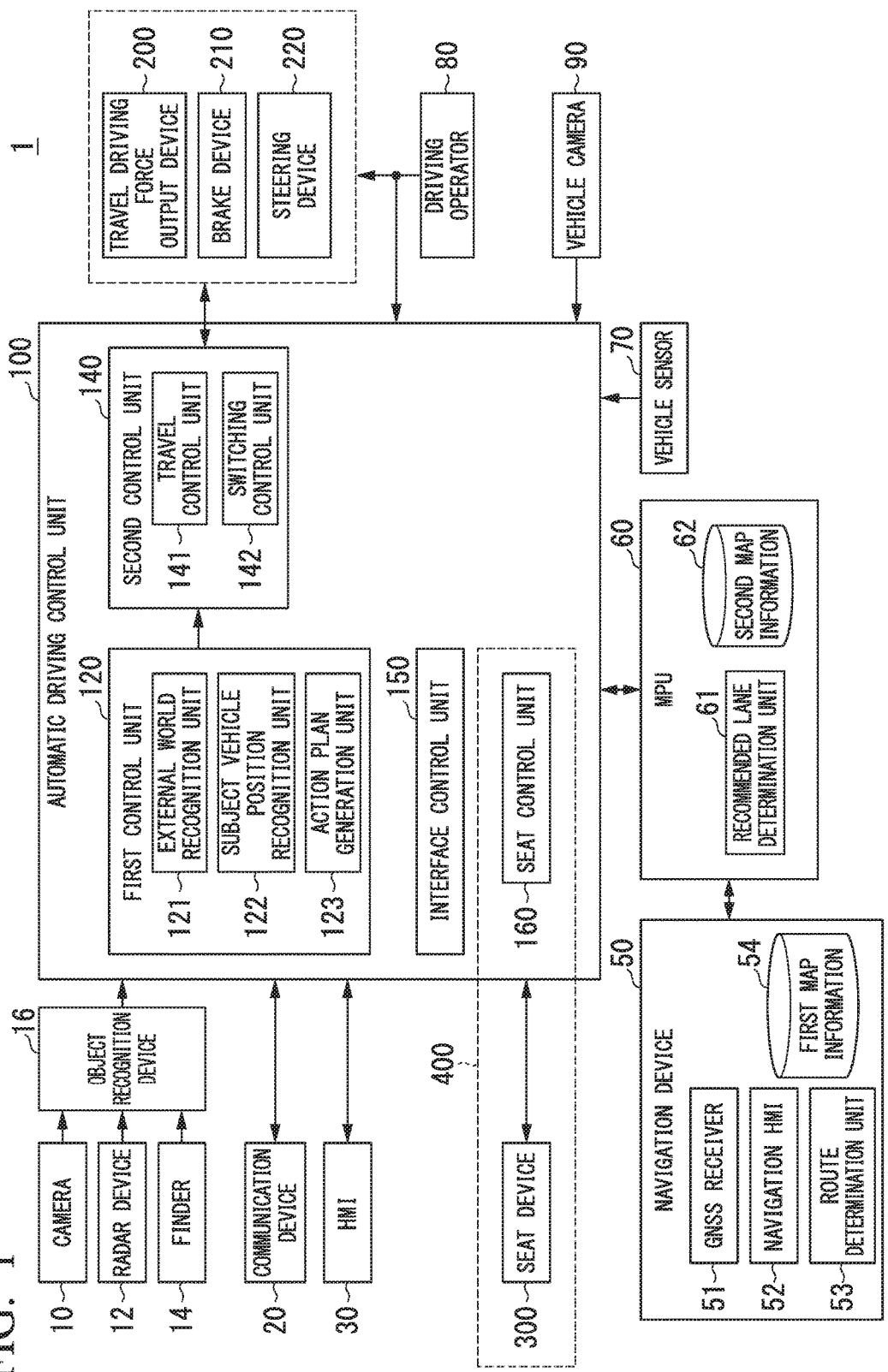
FIG. 1 is a configuration diagram of a vehicle system 1 according to a first embodiment.

FIG. 1 is a configuration diagram of a vehicle system 1 according to a first embodiment. A vehicle on which the vehicle system 1 is mounted (hereinafter referred to as a vehicle M) is, for example, a vehicle such as a two-wheeled, three-wheeled, or four-wheeled vehicle. A driving source thereof is an internal combustion engine such as a diesel engine or a gasoline engine, an electric motor, or a combination thereof. The electric motor is operated using power generated by a generator connected to the internal combustion engine, or discharge power of a secondary battery or a fuel cell.

The vehicle system 1 includes, for example, a camera 10, a radar device 12, a finder 14, an object recognition device 16, a communication device 20, a human machine interface (HMI) 30, a navigation device 50, a micro-processing unit (MPU) 60, a vehicle sensor 70, a driving operator 80, an in-vehicle camera 90, an automatic driving control unit 100, a travel driving force output device 200, a brake device 210, a steering device 220, and a seat device 300. The devices or apparatuses are connected to each other by a multiplex communication line such as a controller area network (CAN), a communication line, a serial communication line, a wireless communication network, or the like. Note that the configuration showed in FIG. 1 is merely an example. The configuration may be partially omitted or another configuration may be added.

The camera 10 is, for example, a digital camera using a solid-state imaging device such as a charge coupled device (CCD) or a complementary metal oxide semiconductor (CMOS). One or a plurality of cameras 10 are attached to arbitrary places of the vehicle M on which the vehicle system 1 is mounted. In a case in which a front side is imaged, the camera 10 is attached to an upper portion of a front windshield, a rear surface of a rearview mirror, or the like. In a case in which a rear side is imaged, the camera 10 is attached to an upper portion of a rear windshield, a back door, or the like. In a case that a side is imaged, the camera 10 is attached to a door mirror or the like. For example, the camera 10 periodically repeatedly images the periphery of the vehicle M. The camera 10 may be a stereo camera.

The radar device 12 radiates radio waves such as millimeter waves to the vicinity of the vehicle M and detects radio waves reflected by the object (reflected waves) to detect at least a position (a distance and a direction) of the object. One or a plurality of radar devices 12 are attached to arbitrary places of the vehicle M. The radar device 12 may detect a position and a speed of the object using a frequency modulated continuous wave (FMCW) scheme.

The finder 14 is a light detection and ranging or laser imaging detection and ranging (LIDAR) which measures scattered light with respect to irradiation light and detects a distance to the object. One or a plurality of finders 14 are attached to arbitrary places of the vehicle M.

The object recognition device 16 performs a sensor fusion process on detection results of some or all of the camera 10, the radar device 12, and the finder 14 to recognize a position, a type, a speed, and the like of the object. The object recognition device 16 outputs a recognition result to the automatic driving control unit 100.

The communication device 20 communicates with other vehicles near the vehicle M, for example, using a cellular network, a Wi-Fi network, Bluetooth (registered trademark), dedicated short range communication (DSRC), or the like, or communicates with various server devices via a wireless base station. The communication device 20 communicates with a terminal device possessed by a person outside the vehicle.

The HMI 30 presents various types of information to an occupant in the vehicle and receives an input operation from the occupant. Examples of the HMI 30 include various display devices, speakers, buzzers, touch panels, various operating switches, or keys.

The navigation device 50 includes, for example, a global navigation satellite system (GNSS) receiver 51, a navigation HMI 52, and a route determination unit 53, and stores first map information 54 in a storage device such as a hard disk drive (HDD) or a flash memory. The GNSS receiver specifies the position of the vehicle M on the basis of a signal received from a GNSS satellite. The position of the vehicle M may be specified or extrapolated by an inertial navigation system (INS) using an output of the vehicle sensor 70. The navigation HMI 52 includes a display device, a speaker, a touch panel, keys, or the like. The navigation HMI 52 may be partly or wholly shared with the above-described HMI 30. For example, the route determination unit 53 may determine a route to the destination input by the occupant using the navigation HMI 52 (including, for example, information on transit points at the time of traveling to the destination), from the position of the vehicle M specified by the GNSS receiver 51 (or an arbitrary input position), by referring to the first map information 54. The first map information 54 is, for example, information in which a road shape is expressed by a link indicating a road and nodes connected by a link. The first map information 54 may include a curvature of the road, point of interest (POI) information, or the like. The route determined by the route determination unit 53 is output to the MPU 60. Further, the navigation device 50 may perform route guidance using the navigation HMI 52 on the basis of the route determined by the route determination unit 53. Note that the navigation device 50 may be realized using a function of a terminal device such as a smartphone or a tablet terminal held by the user, for example. Further, the navigation device 50 may transmit a current position and the destination to the navigation server via the communication device 20, and acquire a route returned from the navigation server.

The MPU 60 functions as, for example, a recommended lane determination unit 61, and holds second map information 62 in the storage device such as an HDD or a flash memory. The recommended lane determination unit 61 divides the route provided from the navigation device 50 into a plurality of blocks (for example, divides the route every 100 ml in a travel direction of the vehicle), and determines a recommended lane for each block by referring to the second map information 62. The recommended lane determination unit 61 determines which lane from the left the vehicle M travels on. The recommended lane determination unit 61 determines the recommended lane so that the vehicle M can travel on a reasonable travel route to a branch destination when there are branching points, merging points, or the like on the route.

The second map information 62 is map information with higher accuracy than the first map information 54. The second map information 62 includes, for example, information on a center of a lane or information on a boundary of a lane. Further, the second map information 62 may include road information, traffic regulation information, address information (address and postal code), facility information, telephone number information, and the like. The road information includes information indicating a type of a road, such as a highway, toll road, national road, or prefectural road, the number of lanes of a road, an area of an emergency parking zone, a width of each lane, a gradient of a road, a position of a road (three-dimensional coordinates including longitude, latitude, and height), curvatures of curves of lanes, positions of merging and branching points of a lane, or information on signs or the like provided on a road. The second map information 62 may be updated at any time by accessing another device using the communication device 20.

The vehicle sensor 70 includes a vehicle speed sensor that detects a current speed of the vehicle M, an acceleration sensor that detects an acceleration in the travel direction of the vehicle M, a yaw rate sensor that detects an angular speed around a vertical axis, a direction sensor that detects a direction of the vehicle M, and the like. The acceleration sensor may include, for example, a lateral acceleration sensor that detects a gravitational acceleration in a lateral direction of the vehicle M (hereinafter referred to as "lateral acceleration").

The driving operator 80 includes, for example, an accelerator pedal, a brake pedal, a shift lever, a steering wheel, and other operators. A sensor that detects the amount of an operation or the presence or absence of an operation is attached to the driving operator 80, and a result of the detection is output to one or both of the automatic driving control unit 100, and the travel driving force output device 200, the brake device 210, and the steering device 220.

The in-vehicle camera 90, for example, images the interior of the vehicle M. For example, the in-vehicle camera 90 images the seat device 300 or the periphery of the seat device 300. The in-vehicle camera 90, for example, periodically repeatedly images the interior of the vehicle M. A captured image of the in-vehicle camera 90 is output to the automatic driving control unit 100.

[Automatic Driving Control Unit]

The automatic driving control unit 100 includes, for example, a first control unit 120, a second control unit 140, an interface control unit 150, a seat control unit 160, an occupant state determination unit 170, and a storage unit 180. The first control unit 120, the second control unit 140, the interface control unit 150, the seat control unit 160, and the occupant state determination unit 170, and the storage unit 180 are each realized by a processor such as a central processing unit (CPU) executing a program (software). Further, some or all of functional units of the first control unit 120, the second control unit 140, the interface control unit 150, the seat control unit 160, the occupant state determination unit 170, and the storage unit 180 to be described below may be realized by hardware such as a large scale integration (LSI), an application specific integrated circuit (ASIC), or a field-programmable gate array (FPGA), or may be realized by software and hardware in cooperation. The program may be stored in a storage device such as an HDD or a flash memory in advance, or may be stored in a detachable storage medium such as a DVD or a CD-ROM and the storage medium may be mounted on the drive device and installed in a storage device.

The first control unit 120 includes, for example, an external world recognition unit 121, a subject vehicle position recognition unit 122, and an action plan generation unit 123.

The external world recognition unit 121 recognizes a state such as a position, a speed, and an acceleration of a nearby vehicle on the basis of information input from the camera 10, the radar device 12, and the finder 14 via the object recognition device 16. The position of a nearby vehicle may be represented by a representative point such as a centroid or a corner of the nearby vehicle or may be represented by an area represented by an outline of the nearby vehicle. The "state" of a nearby vehicle may include an acceleration, a jerk, or a "state of action" (for example, whether or not the nearby vehicle is changing lanes or is about to change lanes) of the nearby vehicle.

Further, the external world recognition unit 121 may recognize a position of a guardrail, a telephone pole, a parked vehicle, a person such as a pedestrian, or other objects, in addition to a nearby vehicle.

The subject vehicle position recognition unit 122 recognizes, for example, a lane (travel lane) along which the subject vehicle M is traveling, and a relative position and posture of the subject vehicle M relative to the travel lane. The subject vehicle position recognition unit 122, for example, compares a pattern (for example, an arrangement of solid lines and broken lines) of road partition line obtained from the second map information 62 with a pattern of a road partition line near the subject vehicle M recognized from an image captured by the camera 10 to recognize a travel lane. In this recognition, the position of the subject vehicle M acquired from the navigation device 50 or a result of a process using an INS may be taken into consideration.

Figure 2:
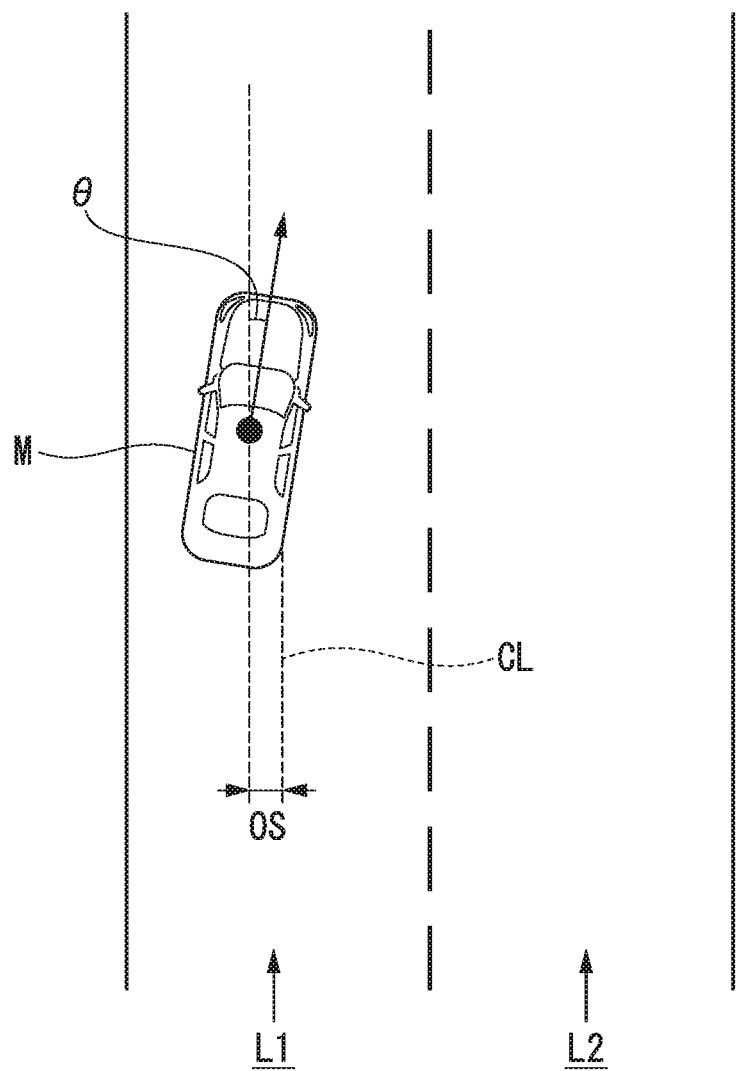
FIG. 2 is a diagram showing a state in which a relative position and a posture of a vehicle M relative to a travel lane L1 are recognized by a subject vehicle position recognition unit 122.

The subject vehicle position recognition unit 122 recognizes, for example, a position or a posture of the subject vehicle M relative to the travel lane. FIG. 2 is a diagram showing a state in which a relative position and posture of the subject vehicle M relative to the travel lane L1 are recognized by the subject vehicle position recognition unit 122. The subject vehicle position recognition unit 122, for example, recognizes a deviation OS of a reference point (for example, a centroid) of the subject vehicle M from a travel lane center CL and an angle θ of a travel direction of the subject vehicle M with respect to a line connecting the travel lane center CL as the relative position and posture of the subject vehicle M relative to the travel lane L1. Note that, alternatively, the subject vehicle position recognition unit 122 may recognize, for example, a position of the reference point of the subject vehicle M relative to any one of side end portions of the travel lane L1 as a relative position of the subject vehicle M relative to the travel lane. The relative position of the subject vehicle M recognized by the subject vehicle position recognition unit 122 is provided to the recommended lane determination unit 61 and the action plan generation unit 123.

The action plan generation unit 123 generates an action plan for the vehicle M to performing automatic driving with respect to the destination or the like. The action plan generation unit 123 determines events to be sequentially executed in the automatic driving so that the vehicle M travels along a recommended lane determined by the recommended lane determination unit 61 and so that the vehicle M can cope with surrounding situations of the vehicle M. The events in the automatic driving of the first embodiment include, for example, a constant-speed traveling event in which a vehicle travels on the same travel lane at a constant speed, a lane changing event in which a travel lane of the vehicle M is changed, an overtaking event in which the vehicle M overtakes a preceding vehicle, a following traveling event in which the vehicle M travels following a vehicle, a merging event in which the vehicle M merges at a merging point, a branching event in which the vehicle M is caused to travel in a target direction at a branching point of the road, an emergency stopping event in which the vehicle M is caused to make an emergency stop, and a switching event in which automatic driving is ended and switching to manual driving is performed. An action for avoidance may be scheduled on the basis of the surrounding situation of the vehicle M (presence of nearby vehicles or pedestrians, lane narrowing due to road construction, or the like) during execution of these events.

The action plan generation unit 123 generates a target trajectory along which the vehicle M will travel in the future. The target trajectory includes, for example, a speed element. For example, a plurality of future reference times may be set at predetermined sampling times (for example, every several tenths of a [sec]), and the target trajectory may be generated as a set of target points (trajectory points) at which a vehicle arrives at respective reference times. Thereby, this indicates that, in a case that an interval between the trajectory points is great, the vehicle is traveling at a high speed in a section between trajectory points.

Figure 3:
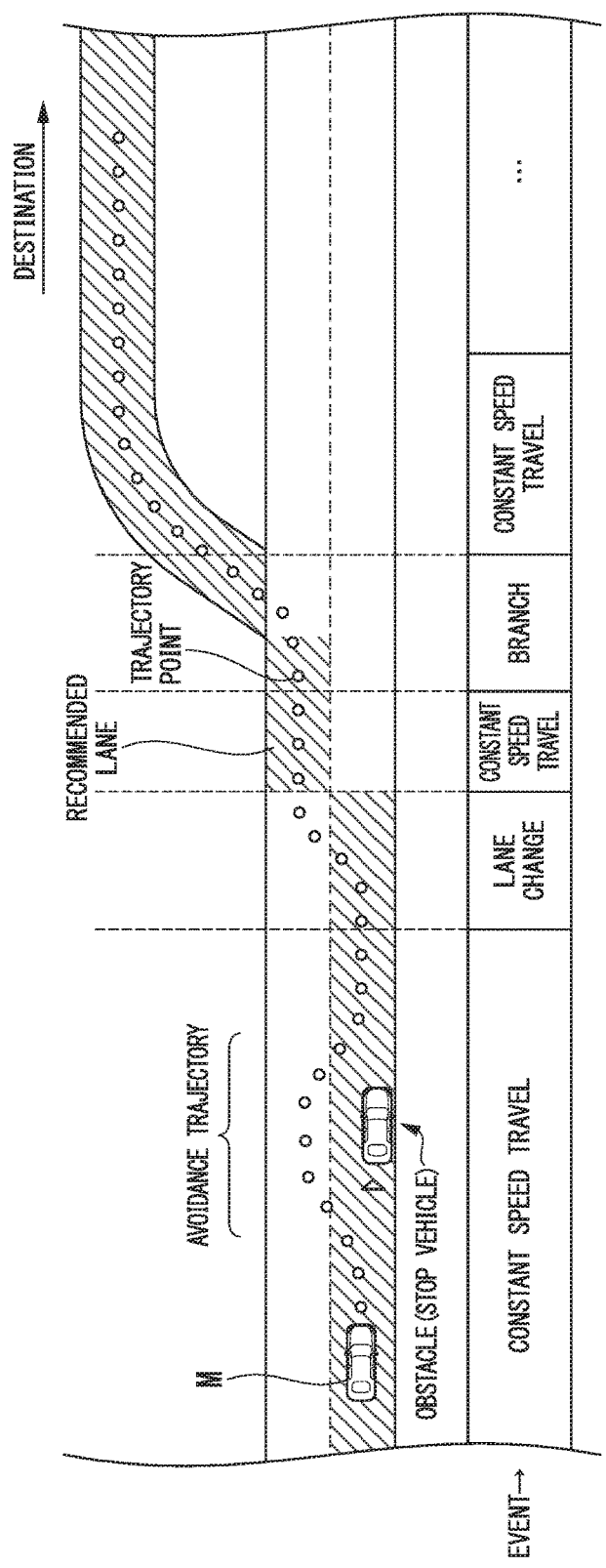
FIG. 3 is a diagram showing a state in which a target trajectory is generated on the basis of a recommended lane.

FIG. 3 is a diagram showing a state in which the target trajectory is generated on the basis of the recommended lane. As showed in FIG. 3, the recommended lane is set to be convenient for traveling along a route to a destination.

When the vehicle reaches a predetermined distance before the recommended lane switching point (which may be determined according to a type of the event), the action plan generation unit 123 activates a lane changing event, a branching event, a merging event, and the like. When it is necessary to avoid an obstacle during execution of one event, an avoidance trajectory is generated as showed in FIG. 3.

The action plan generation unit 123, for example, generates a plurality of target trajectory candidates, and selects an optimal target trajectory suitable for a route to a destination at that point in time on the basis of a viewpoint of safety and efficiency.

The second control unit 140 includes a travel control unit 141 and a switching control unit 142. The travel control unit 141 controls the travel driving force output device 200, the brake device 210, and the steering device 220 so that the vehicle M passes along the target trajectory generated by the action plan generation unit 123 according to scheduled times.

The switching control unit 142 switches the driving mode of the vehicle M on the basis of the action plan generated by the action plan generation unit 123. For example, the switching control unit 142 may switch the driving mode from manual driving to automatic driving at a scheduled start point of the automatic driving. The switching control unit 142 may switch the driving mode from automatic driving to manual driving at a scheduled end point of the automatic driving.

The switching control unit 142 may switch between automatic driving and manual driving on the basis of a switching signal input from an automatic driving changeover switch included in the HMI 30, for example. The switching control unit 142 may switch the driving mode of the vehicle M from automatic driving to manual driving on the basis of an operation for instructing acceleration, deceleration, or steering with respect to the driving operator 80 such as an accelerator pedal, a brake pedal, or a steering wheel.

At the time of manual driving, input information from the driving operator 80 is output to the travel driving force output device 200, the brake device 210, and the steering device 220. The input information from the driving operator 80 may be output to the travel driving force output device 200, the brake device 210, and the steering device 220 via the automatic driving control unit 100. Each electronic control unit (ECU) of the travel driving force output device 200, the brake device 210, and the steering device 220 performs an operation on the basis of the input information from the driving operator 80 or the like.

The interface control unit 150 outputs, for example, a notification regarding a traveling state at the time of automatic driving or manual driving of the vehicle M, a timing at which switching between the automatic driving and the manual driving occurs, or a request for causing the occupant to perform manual driving to the HMI 30. The interface control unit 150 may cause the HMI 30 to output information on the control content in the seat control unit 160. The interface control unit 150 may output the information received by the HMI 30 to the first control unit 120 or the seat control unit 160.

The seat control unit 160, for example, controls the seat device 300 on the basis of information received by the HMI 30, and also controls the seat device 300 at the time of switching of the driving mode in the switching control unit 142 as will be described below. The seat control unit 160 controls the seat device 300 on the basis of information detected by the seat device 300. A function of the seat control unit 160 will be described below in detail.

The travel driving force output device 200 outputs a travel driving force (torque) for travel of the vehicle to driving wheels. The travel driving force output device 200 includes, for example, a combination of an internal combustion engine, an electric motor, a transmission, and the like, and an ECU that controls these. The ECU controls the above configuration according to information input from the travel control unit 141 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the travel control unit 141 or information input from the driving operator 80 so that a brake torque according to a braking operation is output to each wheel. The brake device 210 may include a mechanism that transfers the hydraulic pressure generated by an operation of the brake pedal included in the driving operator 80 to the cylinder via a master cylinder as a backup.

Note that the brake device 210 is not limited to the above-described configuration and may be an electronically controlled hydraulic brake device that controls an actuator according to information input from the travel control unit 141 or information input from the driving operator 80 to transfer the hydraulic pressure of the master cylinder to the cylinder. Further, the brake device 210 may include a plurality of brake device systems in consideration of safety.

The steering device 220 includes, for example, a steering ECU and an electric motor. The electric motor, for example, applies a force to a rack and pinion mechanism to change a direction of a steered wheel. The steering ECU drives the electric motor according to the information input from the travel control unit 141 or information input from the driving operator 80 to change the direction of the steered wheel.

The seat device 300 is a seat on which an occupant of the vehicle M is seated, and is a seat that can be driven electrically. The seat device 300 includes, for example, a driver's seat in which the driving operator 80 is provided, a passenger's seat, a rear seat, and the like. In the following description, the "seat device 300" is assumed to be a seat device on a driver's seat.

[Seat Control System]

Hereinafter, the seat control system 400 according to the first embodiment will be described. The seat control system 400 includes a seat device 300 and a seat control unit 160.

Figure 4:
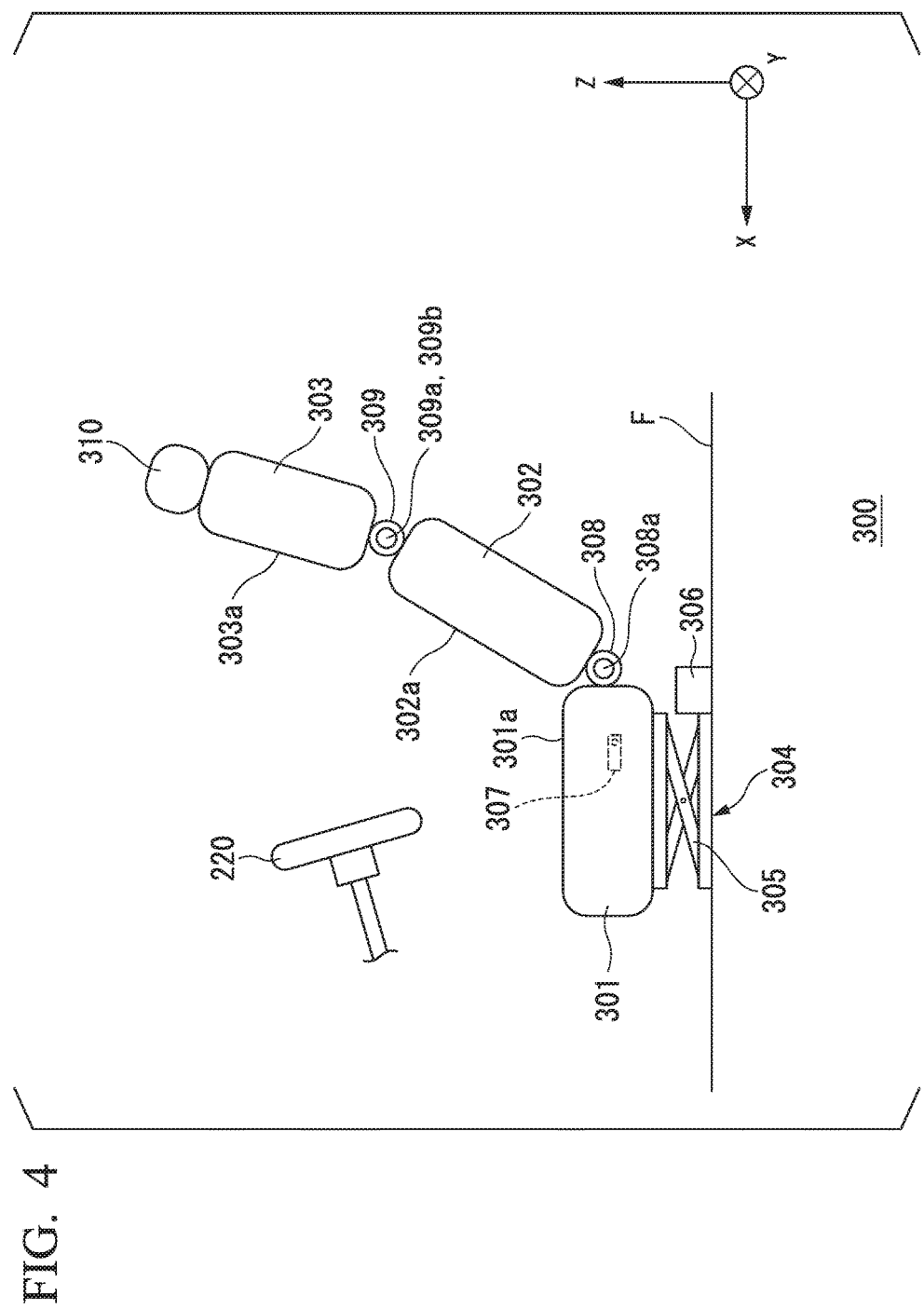
FIG. 4 is a configuration diagram of a seat device 300 according to the first embodiment.

FIG. 4 is a diagram showing the seat device 300. The seat device 300 includes, for example, a seating portion 301, a first backrest portion 302, a second backrest portion 303, and a seat surface adjustment unit 304. One end of the seating portion 301 and a lower end of the first backrest portion 302 are rotatably connected by a first connection unit 308. An upper end of the first backrest portion 302 and a lower end of the second backrest portion 303 are rotatably connected by a second connection unit 309. A headrest 310 is provided at the upper end of the second backrest portion 303.

A seat surface 301a on which the driver sits is formed in the seating portion 301. The seat surface 301a is formed of a cushioning material. The seating portion 301 is provided on a floor surface F via the seat surface adjustment unit 304. In the seating portion 301, a height of the seat surface 301a can be adjusted by the seat surface adjustment unit 304. The seat surface adjustment unit 304 includes an elevation mechanism 305 that raises and lowers the seating portion 301, and a driving unit 306 that drives the elevation mechanism 305.

The elevation mechanism 305 includes, for example, an X-shaped arm that extends and contracts in a vertical direction. The driving unit 306 includes, for example, a motor. The driving unit 306 extends and contracts the elevation mechanism 305 in a vertical direction, for example, by rotating a ball screw interlocked with a rotating shaft of a motor (not showed). The driving unit 306 detects the height of the seat surface 301a, for example, according to a rotational speed of the motor. The driving unit 306 is connected to the seat control unit 160 and is controlled by the seat control unit 160 (see FIG. 5).

The seat surface adjustment unit 304 can adjust the position of an upper end of the second backrest portion 303 after a reclining angle is set as will be described below by raising or lowering the seating portion 301. The above configuration of the seat surface adjustment unit 304 is an example, and any configuration such as a gear or a hydraulic mechanism may be used as long as the configuration can raise or lower the seating portion 301.

The first backrest portion 302 is a member that supports a torso portion of the driver. In the first backrest portion 302, a backrest surface 302a is formed of a cushioning material. The first backrest portion 302 can enter a reclining state with the rotation angle with respect to the floor surface F through the first connection unit 308. The first connection unit 308 has, for example, a rotation hinge structure.

The first connection unit 308 includes, for example, a biasing means (not showed) such as a rotating spring, and biases the first backrest portion 302 in a direction (+X direction) in which an angle between the first backrest portion 302 and the seating portion 301 is reduced. The first connection unit 308 includes a locking mechanism (not showed) interlocking with a lever 307 provided in the seating portion 301.

In a case that the lever 307 is released, the first backrest portion 302 falls forward (in the X direction) with the first connection unit 308 as a pivot due to a biasing force of the first connection unit 308. In a case that the driver applies a force to the backrest surface 302a in a rearward direction (−X direction) in a state in which the lever 307 is released, the first backrest portion 302 falls backward with the first connection unit 308 as a pivot. Thus, the driver can adjust the reclining angle of the first backrest portion 302. Although the above configuration of the first connection unit 308 is exemplified as a mechanical type, the first connection unit 308 may be driven by an electric motor or any configuration can may be used as long as an angle can be adjusted.

The first connection unit 308 includes a first angle detection unit 308a (see FIG. 5) that detects a first angle θ1 that is formed between the seating portion 301 and the first backrest portion 302. The first angle detection unit 308a is connected to the seat control unit 160. For example, since the seating portion 301 is installed in parallel to the floor surface F, an angle that is formed between the floor surface F and the backrest portion 302 may be treated as the first angle θ1.

The second backrest portion 303 is formed of a cushioning material. The second backrest portion 303 supports an upper body of the driver with the backrest surface 303a. A headrest 310 is provided at a distal end of the second backrest portion 303. The headrest 310 supports a head or a neck of the driver D seated on the seating portion 301. The second backrest portion 303 can be disposed with a folding angle with respect to the first backrest portion 302 by the second connection unit 309. The second connection unit 309 includes, for example, a second angle detection unit 309a that detects a second angle θ2 formed between the second backrest portion 302 and the first backrest portion 302 (see FIG. 5).

The second connection unit 309 includes a folding adjustment unit 309b. The folding adjustment unit 309b is configured of, for example, a motor and a reduction gear, and adjusts a second angle θ2 of the second connection unit 309 to a folding angle θ. Here, the folding angle θ is defined as a sum of the first angle θ1 and the second angle θ2. The folding angle θ is an angle between the floor surface F and the second backrest portion 303 (see FIGS. 6 and 7).

Any unit such as a stepping motor or an actuator may be used as the folding adjustment unit 309b as long as the unit can adjust the folding angle. The second angle detection unit 309a and the folding adjustment unit 309b are connected to the seat control unit 160 (see FIG. 5). The folding adjustment unit 309b is controlled by the seat control unit 160.

Figure 5:
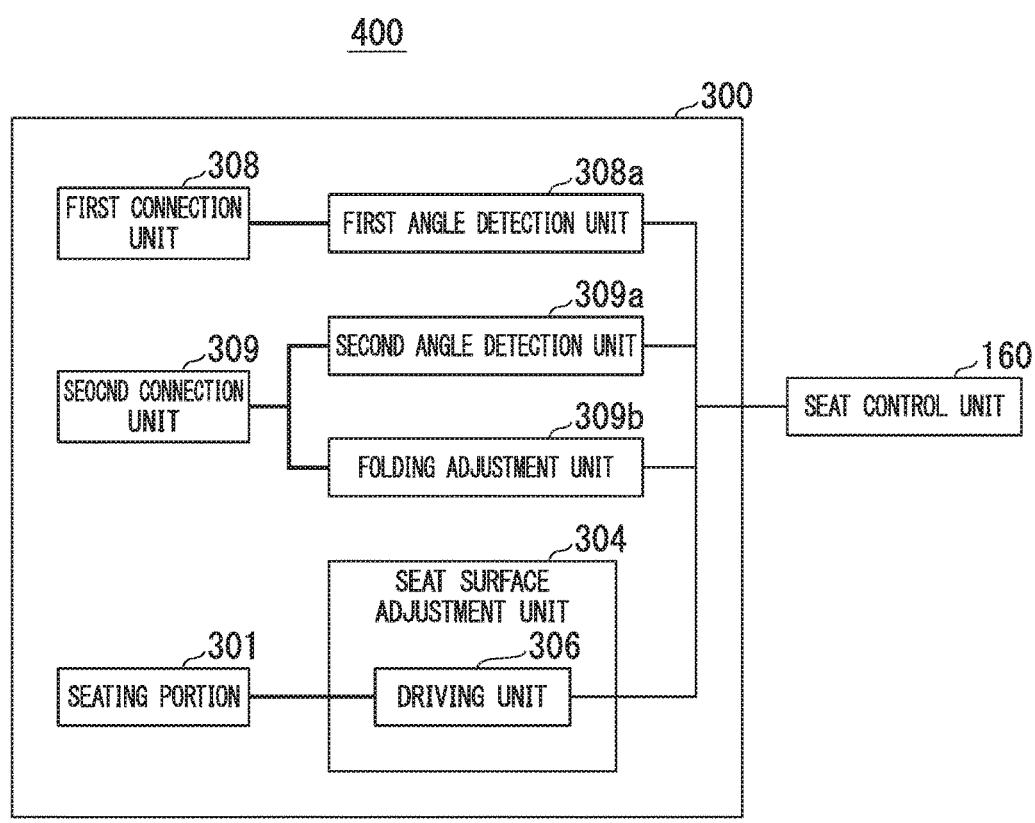
FIG. 5 is a block diagram showing a configuration of a seat control system 400.

FIG. 5 is a block diagram showing a configuration of the seat control system 400. The seat control unit 160 controls the folding adjustment unit 309b and the seat surface adjustment unit 304 on the basis of the detection result of the first angle detection unit 308a. The seat control unit 160 controls the seat device 300, for example, in a case that the driving mode of the vehicle M is switched from manual driving to automatic driving. In a case that the switching control unit 142 (see FIG. 1) switches the driving mode from the manual driving to the automatic driving at a scheduled start point of the automatic driving (see FIG. 3), the seat control unit 160 starts the control of the seat device 300.

In this case, the seat control unit 160 may display the fact that the control of the seat device 300 is started on the HMI 30. In a case that the switching control unit 142 has switched the driving mode from the automatic driving to the manual driving at an scheduled end point of the automatic driving, the seat control unit 160 may control the seat device 300 to cause the state thereof to the state of the seat device 300 at the time of the end of previous manual driving.

Hereinafter, a specific method of controlling the seat device 300 using the seat control unit 160 will be described.

Figure 6:
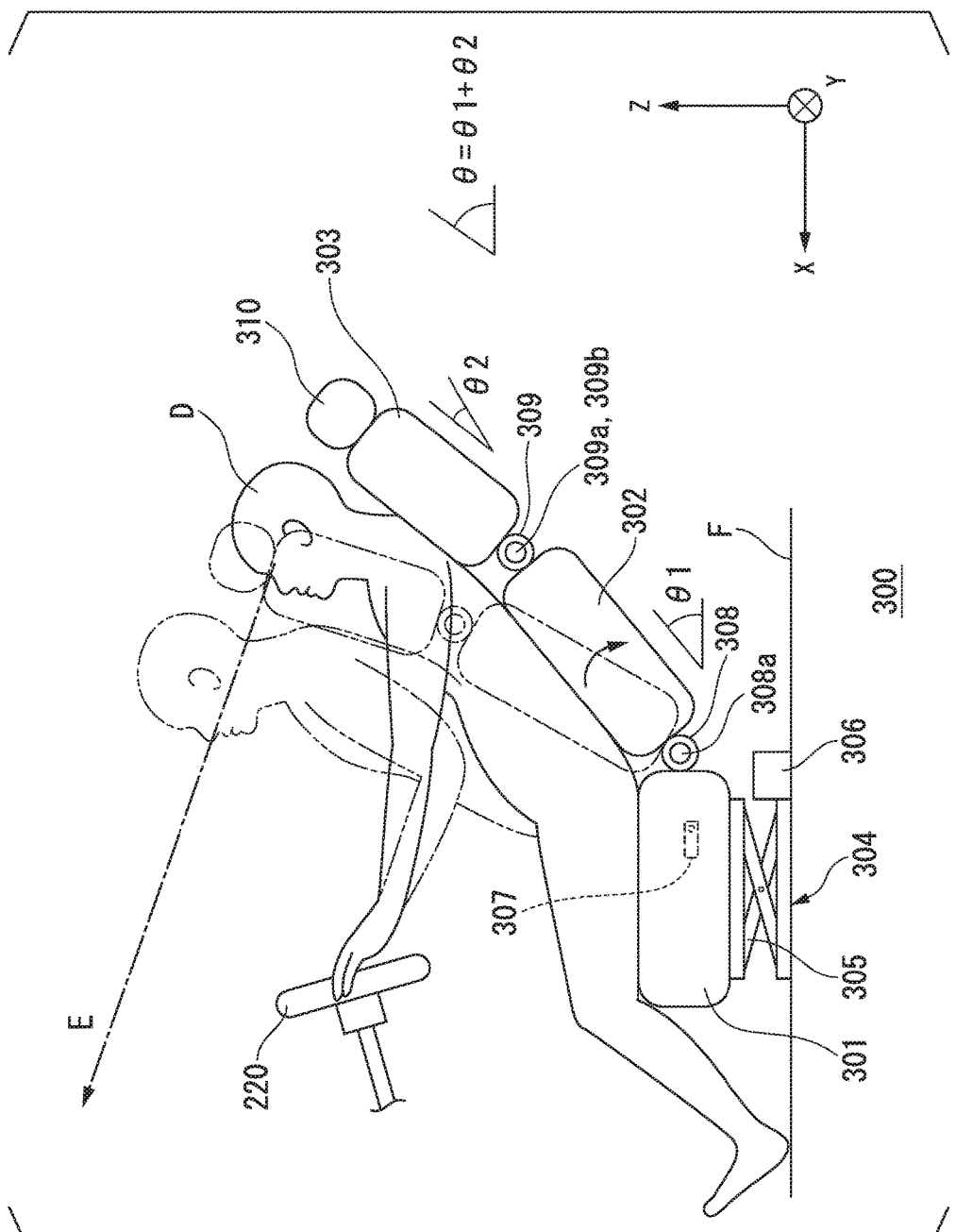
FIG. 6 is a diagram showing a seat device 300 in a reclining state.

FIG. 6 is a diagram showing the seat device 300 in the reclining state. In a case that the first backrest portion 302 enters the reclining state, the driver D unlocks the first connection unit 308 while pulling the lever 307 provided on the side surface of the seating portion 301, for example. Thereafter, the driver presses the first backrest portion 302 backwardly (in the X direction) to form the reclining angle, and returns the lever 307 again, lock the first connection unit 308, and maintain the first backrest portion 302 in the reclining state. In this case, since a line of sight E of the driver D is directed upwardly, it is necessary to direct the line of sight E of the driver D forward for safety.

The first angle detection unit 308a of the first connection unit 308 detects the first angle θ1 between the first backrest portion 302 and the floor surface F in the reclining state. The seat control unit 160 controls the folding adjustment unit 309b to adjust the second angle θ2 on the basis of the first angle θ1 detected by the first angle detection unit 308a, thereby adjusting the folding angle θ. The seat control unit 160 controls the folding adjustment unit 309b to maintain the folding angle θ within a predetermined angle range on the basis of the second angle θ2 detected by the second angle detection unit 309a. Here, the predetermined angle range is a range of the folding angle θ in a state in which the driver D is driving at the time of the manual driving.

Figure 7:
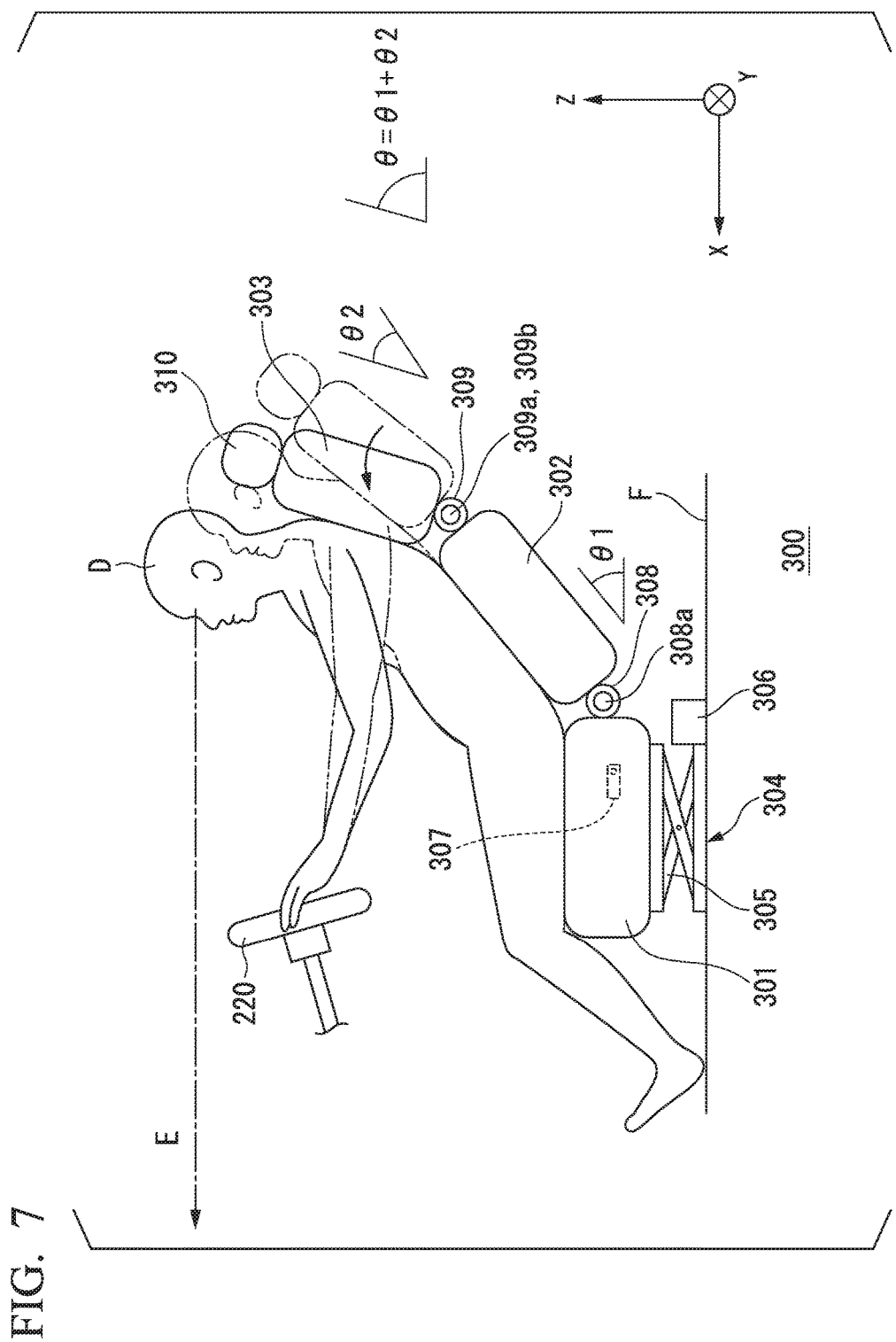
FIG. 7 is a diagram showing a state in which an angle of a second backrest portion 303 is adjusted.

FIG. 7 is a diagram showing a state in which the angle of the second backrest portion 303 is adjusted. That is, even in a case that the angle of the first backrest portion 302 is changed, the seat control unit 160 maintains the posture of the second backrest portion 303 by maintaining the folding angle θ. By the seat control unit 160 maintaining the second angle θ2 within the predetermined angle range, the posture of the second backrest portion 303 is maintained in a posture at the time of manual driving. In this angle range, the line of sight E of the driver D is directed forward. For the predetermined angle range, a detection result of the second angle detection unit 309a at the time of manual driving may be stored, or a preset value may be used.

As described above, in a case that the posture of the second backrest portion 303 is raised upwardly after the first backrest portion 302 has entered the reclining state, the line of sight E of the driver D is at a position lower than a position before the reclining state. In this case, the line of sight E of the driver D is at a position lower than the lower end of the front window according to a magnitude of the first angle θ1 of the first backrest portion 302, and there is concern that a field of vision of the driver D is hindered.

Figure 8:
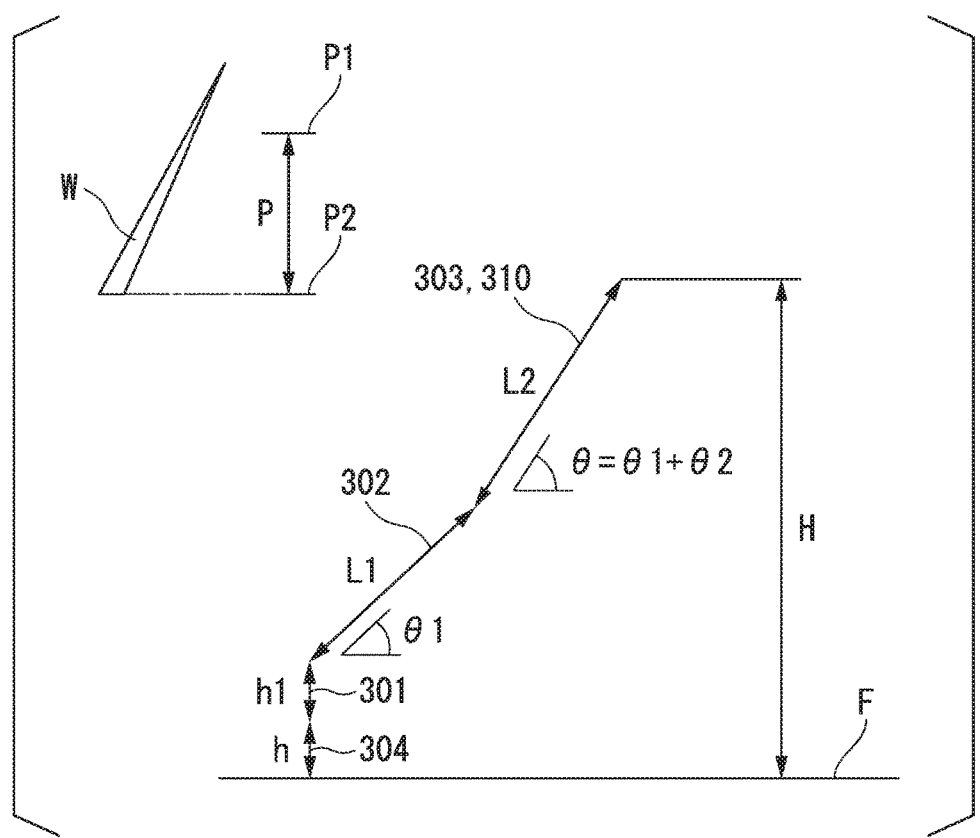
FIG. 8 is a schematic diagram of the seat device 300 for calculating a height of a line of sight E of a driver D.

FIG. 8 is a schematic diagram of the seat device 300 for calculating a height of the line of sight E of the driver D.

A height H of the line of sight E of the driver D from the floor surface F is calculated, for example, using Equation (1). However, the height H of the line of sight E of the driver D (a reference height) is defined as a position of an upper end of the headrest 310.

$$H = L1 \sin θ1 + L2 \sin θ + h1 + h \quad (1)$$

where,

L1: a length of the first backrest portion 302
h1: a thickness of the seating portion 301
h: an adjustment height of the seat surface adjustment unit 304 L2 is a length from the lower end of the second backrest portion 303 to the upper end of the headrest 310.

In a case that the height H (the position of the upper end of the second backrest portion 303) is equal to or smaller than a reference height P2, the seat control unit 160 controls the seat surface adjustment unit 304 to maintain the height H within a predetermined range P higher than the reference height P2. Here, the predetermined range P is set, for example, between a position P1 of the upper end of the second backrest portion 303 in the vehicle M and the position P2 of the lower end of the front window W of the vehicle M at the time of manual driving.

Figure 9:
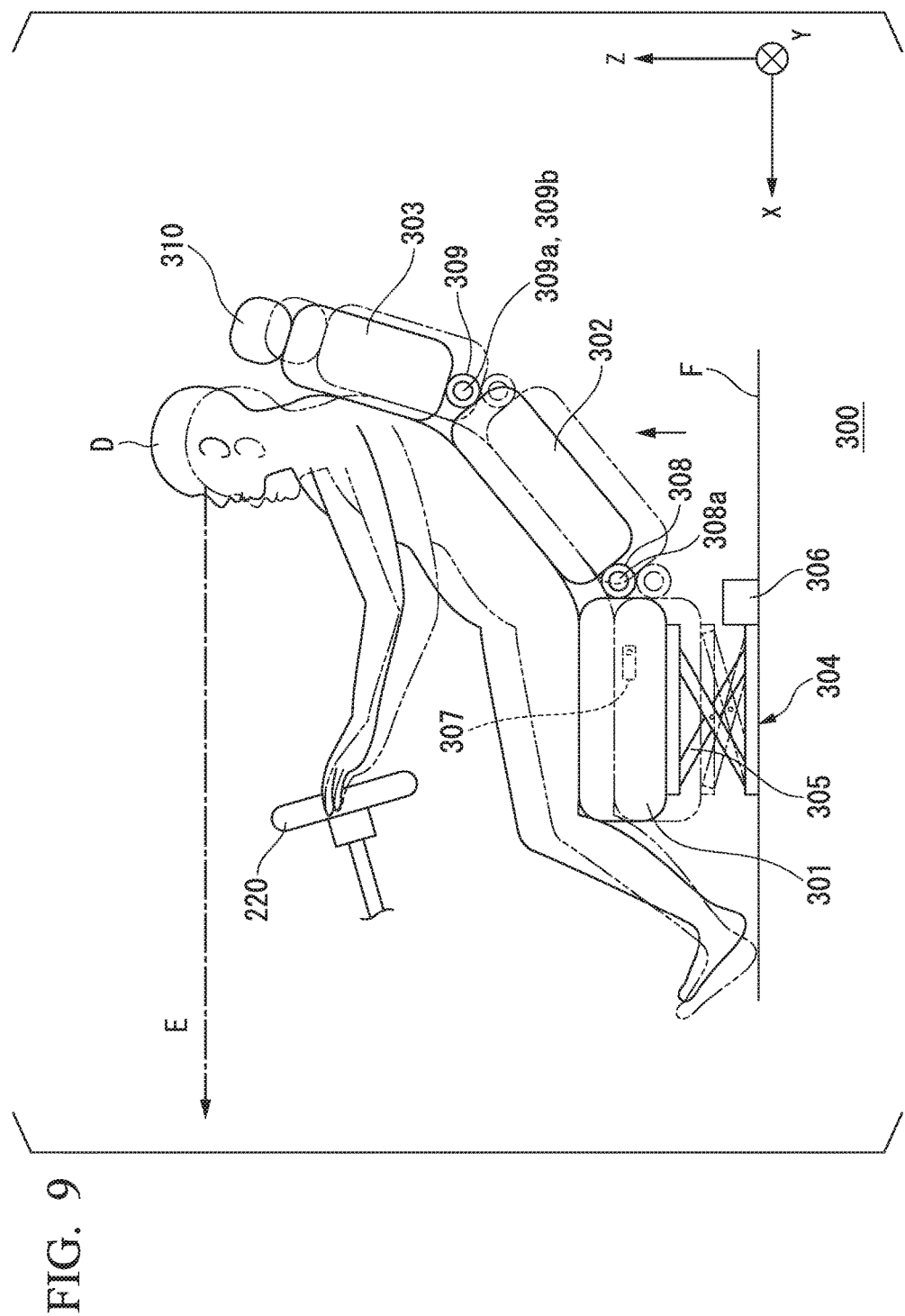
FIG. 9 is a diagram showing a state in which a height of a seat surface 301a is adjusted by a seat surface adjustment unit 304.

FIG. 9 is a diagram showing a state in which a height of the seat surface 301a is adjusted by the seat surface adjustment unit 304. For example, in a case that the height H is located below the reference height P2 at the lower end of the front window W, the seat control unit 160 controls the driving unit 306 of the seat surface adjustment unit 304 to raise the adjustment height h of the seat surface adjustment unit 304 and position the height H above the reference height P2 at the lower end of the front window W. Accordingly, a tip of the line of sight E of the driver D becomes above the position P2 of the lower end of the front window W, and a field of vision of the driver D is secured.

The adjustment height h of the seat surface adjustment unit 304 or the folding angle θ of the second backrest portion 303 may be finely adjusted by the driver D. In this case, the seat control system 400 may store a fine adjustment value for each driver D and adjust the seat device 300 for each driver D at the time of the automatic driving. In setting for each driver D, the seat control unit 160 may receive the setting information using the HMI 30.

Figure 10:
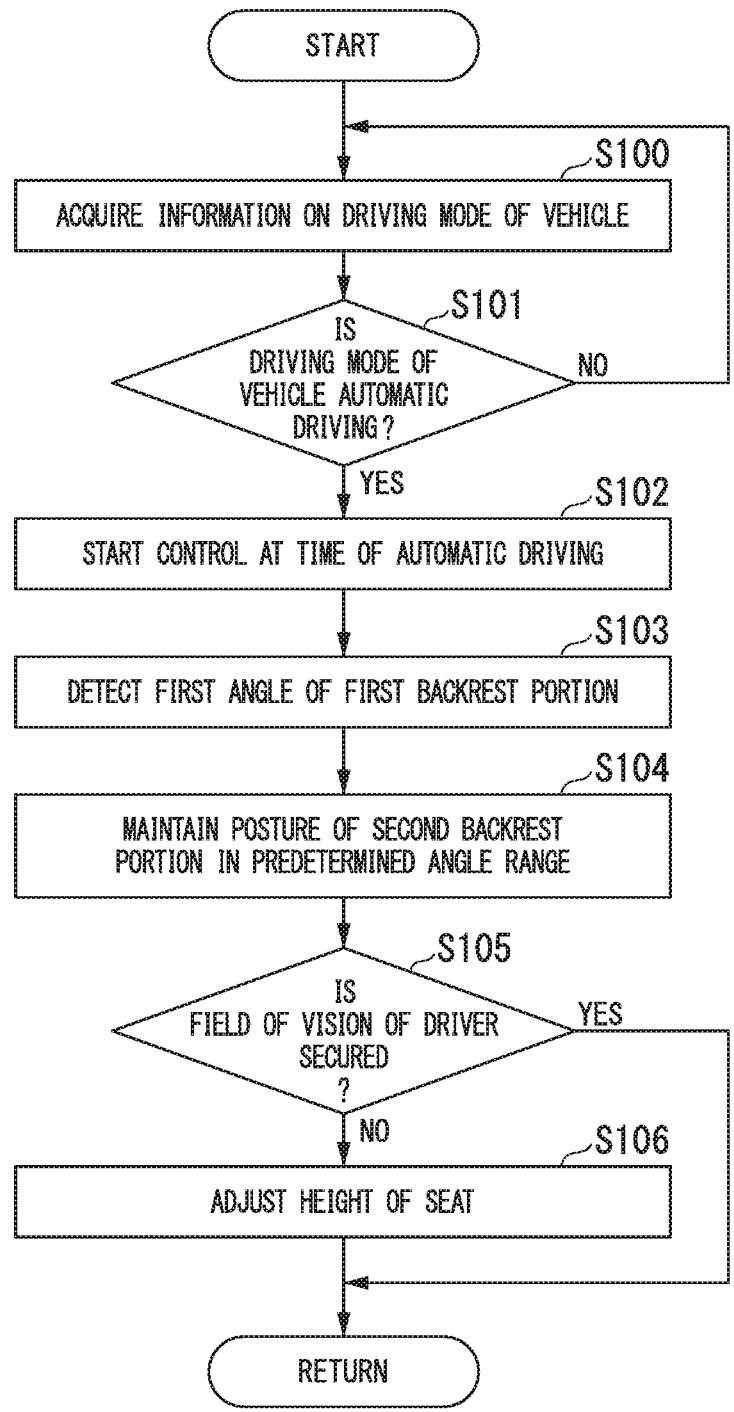
FIG. 10 is a flowchart showing a flow of a process that is performed by a seat control unit 160.

Hereinafter, a flow of a process controlled by the seat control unit 160 will be described. FIG. 10 is a flowchart showing a flow of a process that is performed by the seat control unit 160. The seat control unit 160 acquires information on the driving mode of the vehicle M from the switching control unit 142 (step S100). The seat control unit 160 determines whether or not the driving mode of the vehicle M is an automatic driving on the basis of the information acquired from the switching control unit 142 (step S101). In a case that a positive determination is obtained in step S101, the seat control unit 160 starts the control of the seat device 300 at the time of automatic driving (step S102). In a case that a negative determination is obtained in step S101, the seat control unit 160 returns the process to step S100.

The seat control unit 160 detects the first angle θ1 of the first backrest portion 302 that is output from the first angle detection unit 308a (step S103). The seat control unit 160 controls the folding adjustment unit 309b of the second connection unit 309 on the basis of the first angle θ1 to change the second angle θ2, adjust the folding angle θ, and maintain the posture of the second backrest portion 303 (step S104). The seat control unit 160 calculates the height H of the line of sight E of the driver D (the height of the upper end of the second backrest portion 303), and determines whether or not the field of vision of the driver D is secured on the basis of a result of the calculation (Step S105).

The seat control unit 160 determines whether or not the field of vision of the driver D is secured based on the height H of the line of sight E of the driver D (step S105). In a case that a negative determination is obtained in step S105, the seat control unit 160 controls the seat surface adjustment unit 304 to adjust the height of the seat device 300 and maintains the height of the upper end of the second backrest portion 303 within the predetermined range (step S106). Thereafter, the seat control unit 160 ends the process of the flowchart. In a case that a positive determination is obtained in step S105, the seat control unit 160 ends the process of the flowchart.

As described above, according to the seat control system 400 of the first embodiment, even in a case that the driver D causes the seat device 300 to enter the reclining state at the time of the automatic driving of the vehicle M, it is possible to secure the field of vision of the driver D.

Second Embodiment

In the seat control system 400 of the first embodiment, in a case that the driver D causes the seat device 300 to enter the reclining state at the time of the automatic driving of the vehicle M, the folding adjustment unit 309b and the seat surface adjustment unit 304 are adjusted to secure the field of vision the driver D. However, according to the reclining angle of the seat device 300, the field of vision of the driver D cannot be secured even with a limit value of the height adjustment range of the seat surface adjustment unit 304 in some cases. In the second embodiment, a seat control system 410 that restricts the reclining angle of the seat device 300 to secure the field of vision of the driver D is showed.

Figure 11:
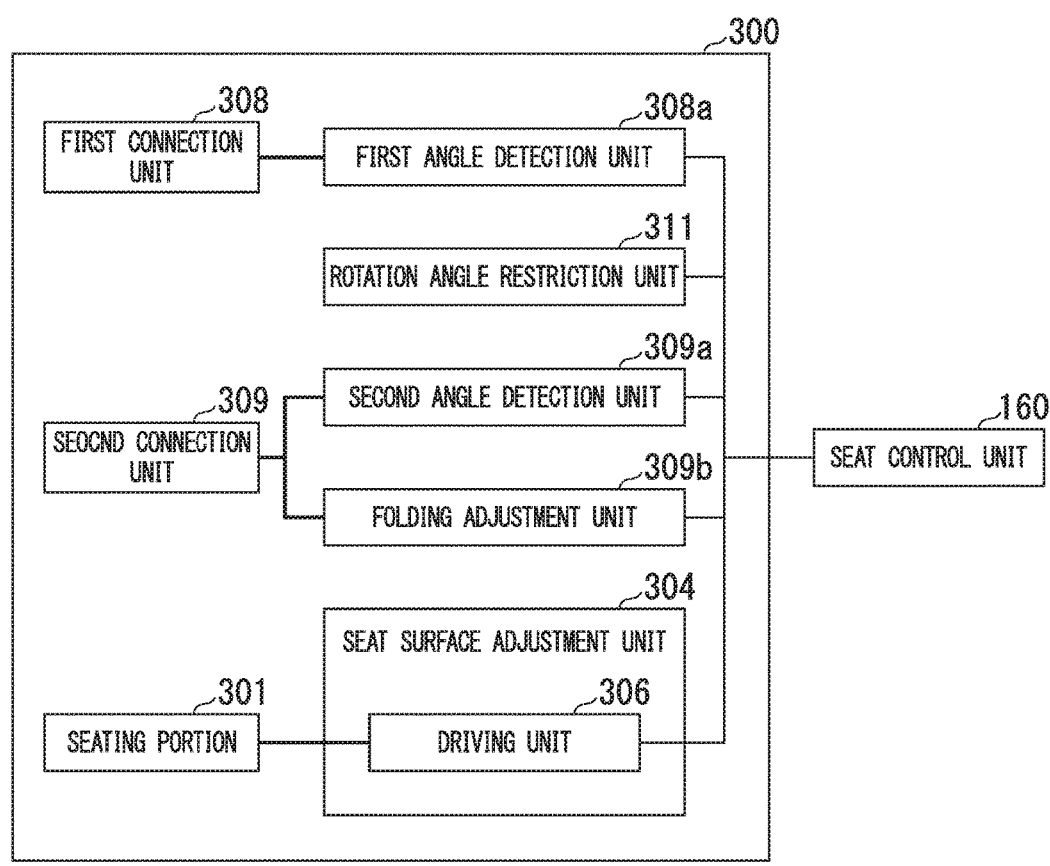
FIG. 11 is a block diagram showing a configuration of a seat control system 410 according to a second embodiment.

FIG. 11 is a block diagram showing a configuration of the seat control system 410 according to the second embodiment.

The seat control system 410 further includes a rotation angle restriction unit 311 that restricts a rotation angle of the first connection unit 308 as compared with the configuration of the seat control system 400 according to the first embodiment. The rotation angle restriction unit 311 is controlled by the seat control unit 160 to lock the rotation of the first connection unit 308. The rotation angle restriction unit 311 may physically restrict the rotation angle of the first backrest portion 302 using, for example, an actuator. Further, for example, in a case that the first connection unit 308 is electrically controlled, the rotation angle restriction unit 311 may be a relay that shuts off a power supply of the first connection unit 308.

In a case that the seat control unit 160 has determined that the rotation angle of the first connection unit 308 does not allow the field of vision of the driver D to be secured, the seat control unit 160 controls the rotation angle restriction unit 311 to lock the rotation of the first connection unit 308. For example, the seat control unit 160 determines whether or not the height H of the field of vision of the driver D in the Equation (1) is located below the reference height P2 (see FIG. 8) at the lower end of the front window using Equation (2).

$$H = L1 \sin θ1 + L2 \sin θ + h1 + h < P2 \quad (2)$$

In a case that the rotation angle exceeds the threshold value of the first angle θ1 which is a condition of satisfaction of Equation (2), the seat control unit 160 controls the rotation angle restriction unit 311 to lock the first connection unit 308, thereby restricting the rotation angle of the seat control unit 160.

That is, in a case in which the rotation angle of the first connection unit 308 is increased to exceed a threshold value of a condition that the height of the reference position is smaller than the reference height even in a case that the seat control unit 160 performs control up to a limit value of a rotation angle of the second backrest portion 303 relative to the first backrest portion 302 and a limit value of an adjustment range of a height of the seat surface adjustment unit 304, the seat control unit 160 controls the rotation angle restriction unit 311 to restrict the rotation angle of the first connection unit 308.

Figure 12:
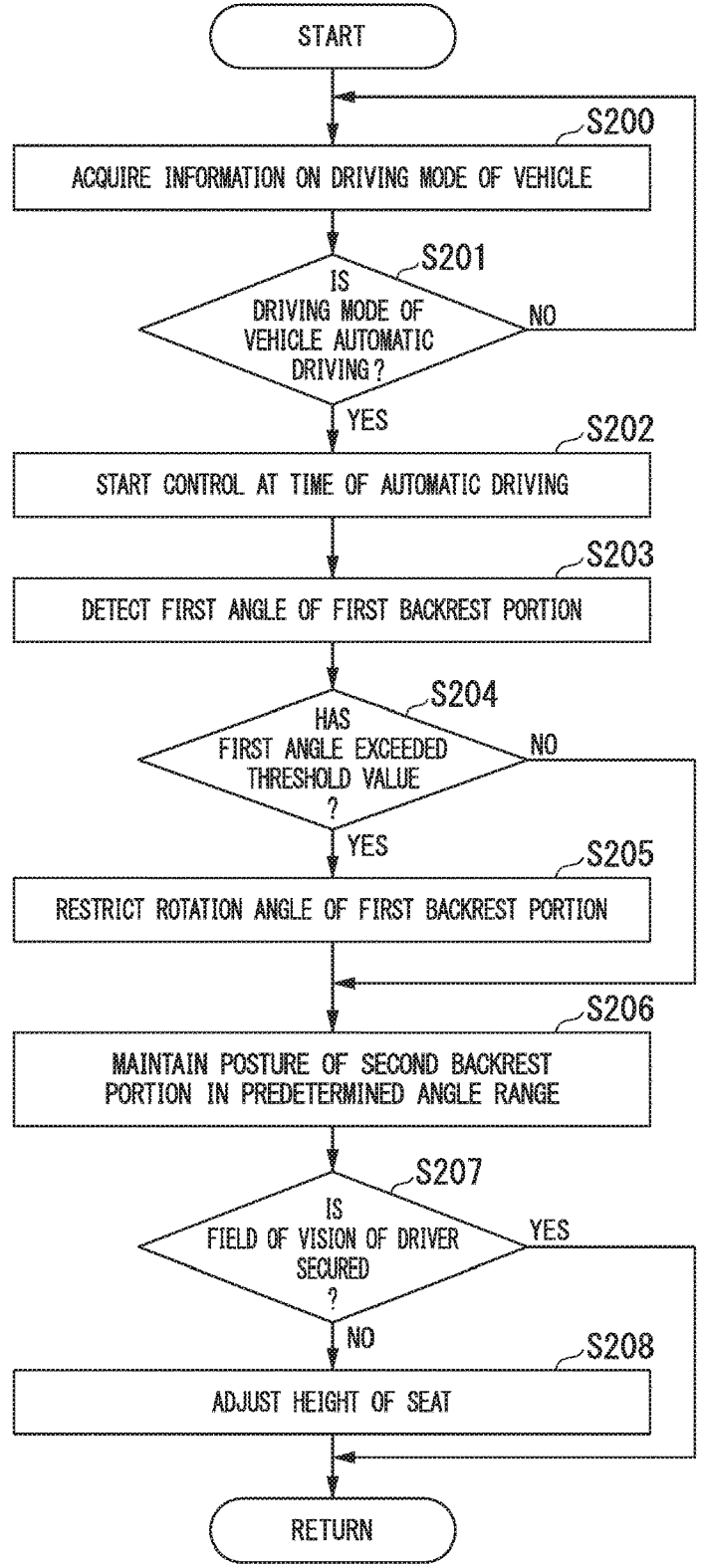
FIG. 12 is a flowchart showing a flow of a process that is performed by a seat control unit 160.

Next, a flow of a process that is controlled by the seat control unit 160 of the seat control system 410 will be described. FIG. 12 is a flowchart showing a flow of process that is performed by the seat control unit 160. In FIG. 12, steps S204 and S205 are added between step S103 and step S104 in FIG. 10. Hereinafter, description of the same processes as in the first embodiment will be appropriately omitted.

The seat control unit 160 detects the first angle θ1 of the first backrest portion 302 that is output by the first angle detection unit 308a (step S203). The seat control unit 160 determines whether or not the first angle θ1 has exceeded the threshold value (step S204). In a case that a positive determination is obtained in step S204, the seat control unit 160 controls the rotation angle restriction unit 311 to restrict the rotation angle of the first backrest portion 302 (step S205). In a case that a negative determination is obtained in step S204, the seat control unit 160 proceeds to a process of step S206. The seat control unit 160 controls the folding adjustment unit 309b of the second connection unit 309 to change the second angle θ2 and maintain the posture of the second backrest portion 303 (step S206).

As described above, according to the seat control system 410 of the second embodiment, it is possible to prevent the reclining angle of the first backrest portion 302 from becoming too large and secure the field of vision of the driver D.

Third Embodiment

In the first and second embodiments, the seat surface adjustment unit 304 is adjusted to secure the field of vision of the driver D. There is concern that a heel of the driver D may be separated from the floor surface F due to an individual difference in a body shape of the driver D in the height adjustment of the seat surface adjustment unit 304. In the third embodiment, a leg portion of the driver D is supported by a leg supporting member interlocked with the height adjustment of the seat surface adjustment unit 304.

Figure 13:
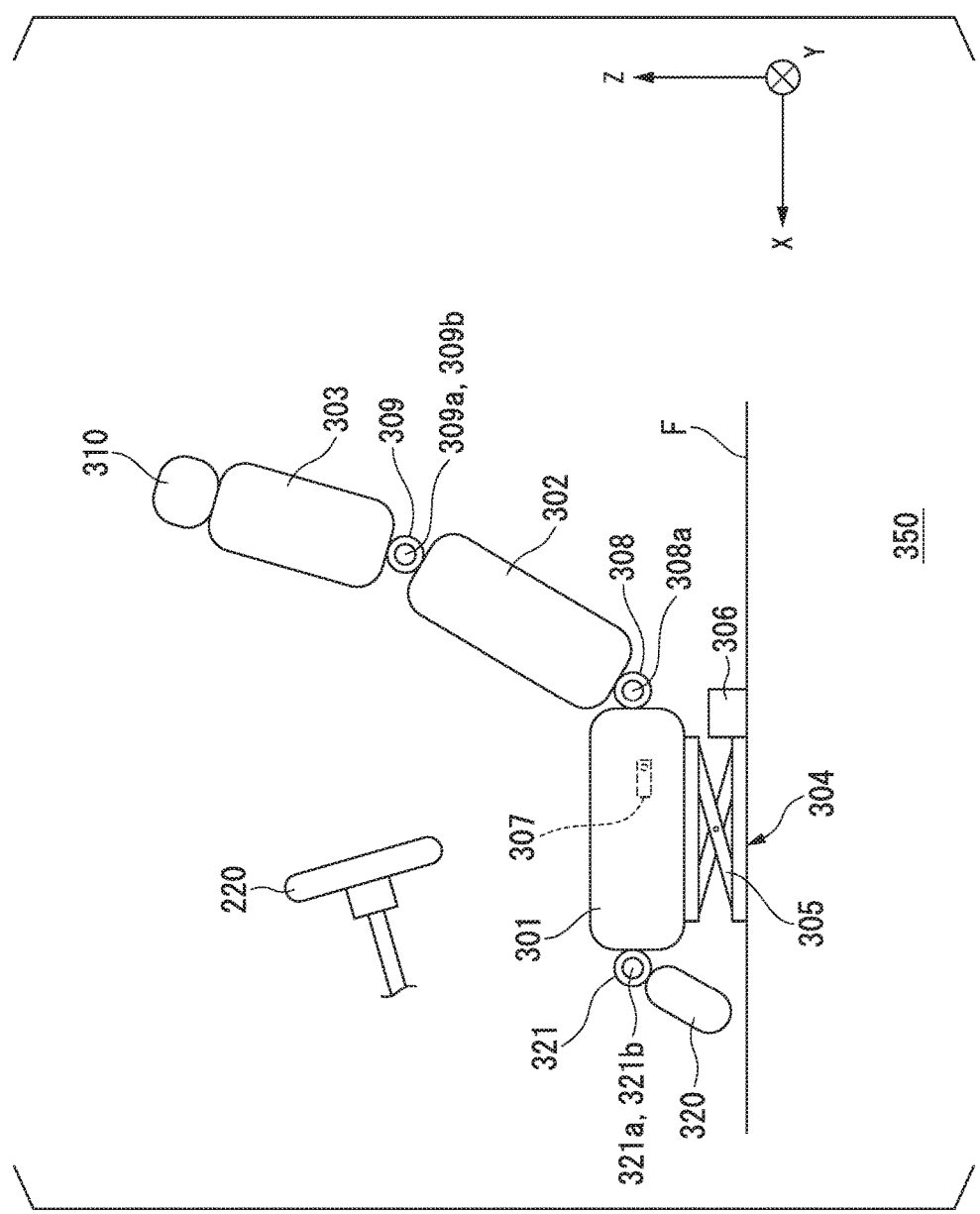
FIG. 13 is a diagram showing a configuration of a seat device 350 according to a third embodiment.

FIG. 13 is a diagram showing a configuration of a seat device 350 according to the third embodiment. The seat device 350 further includes a leg support unit 320 rotatably connected to the seating portion 301 via a third connection unit 321, as compared with the seat device 300 of the first embodiment. The leg support unit 320 is, for example, a footrest or an ottoman. The third connection unit 321 includes a third angle detection unit 321a and a leg angle adjustment unit 321b. The third angle detection unit 321a outputs a third angle θ3 that is formed between the leg support unit 320 and the seating portion 301. The leg angle adjustment unit 321b is controlled by the seat control unit 160 to adjust the third angle θ3 between the leg support unit 320 and the seating portion 301.

Figure 14:
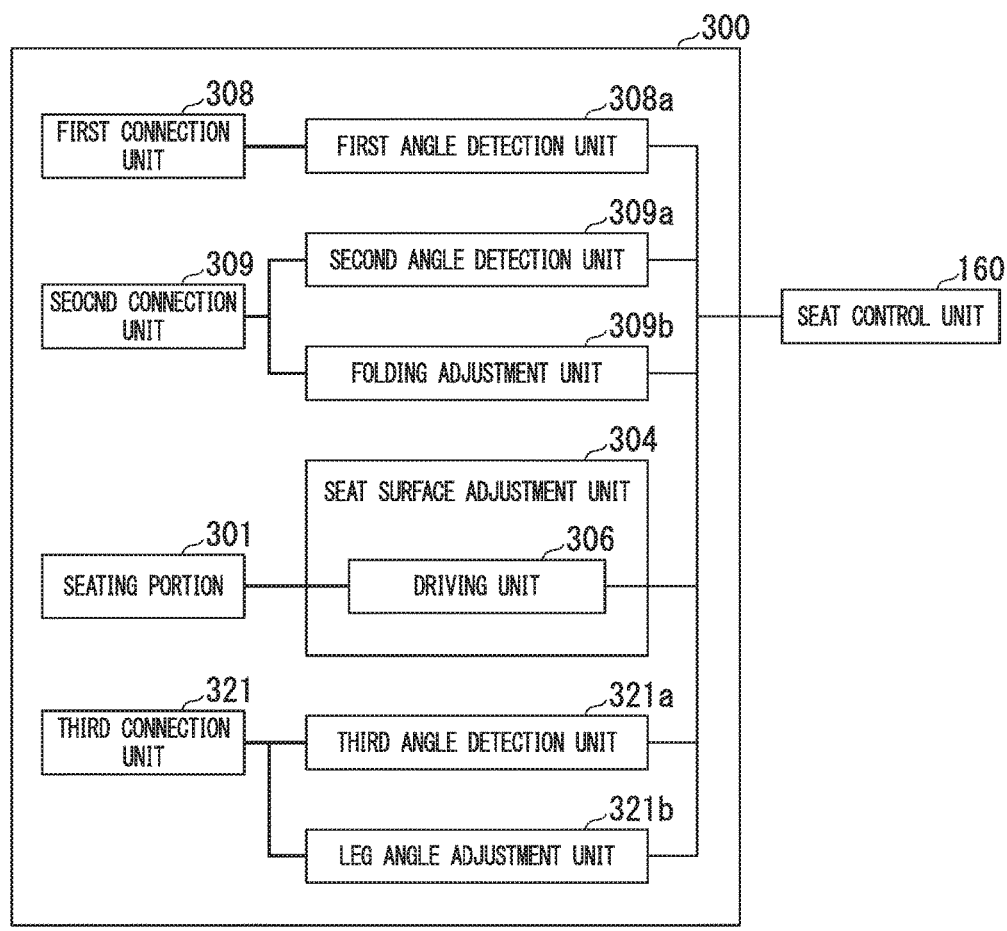
FIG. 14 is a block diagram showing a configuration of a seat control system 420 according to the third embodiment.

FIG. 14 is a block diagram showing a configuration of a seat control system 420 according to the third embodiment. In the configuration of the seat control system 420, a third connection unit 321, a third angle detection unit 321a, and a leg angle adjustment unit 321b are added to the configuration of the seat control system 400 of the first embodiment.

Figure 15:
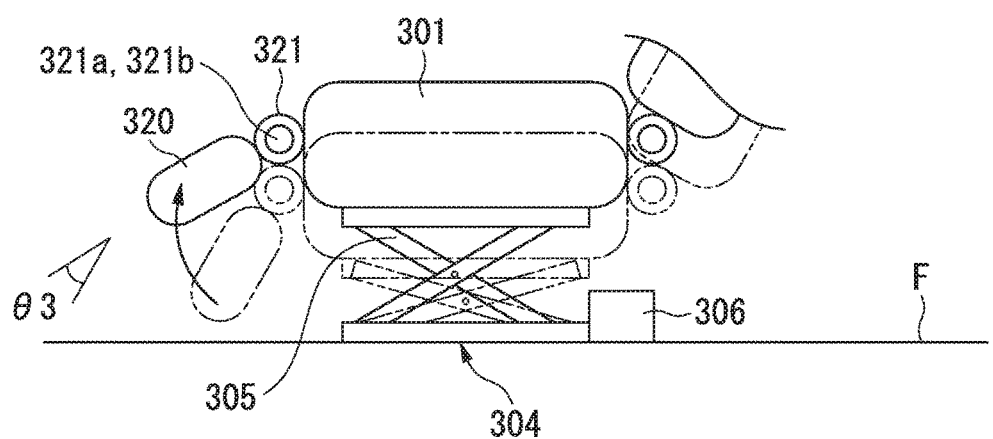
FIG. 15 is a diagram showing an operation state of a leg support unit 320.

FIG. 15 is a diagram showing an operation state of the leg support unit 320. The seat control unit 160 controls the driving unit 306 of the seat surface adjustment unit 304 to raise the seating portion 301 in a case that controlling the seat device 300 at the time of automatic driving of the vehicle M. In this case, the seat control unit 160 controls the leg angle adjustment unit 321b of the leg support unit 320 on the basis of an output of the third angle detection unit 321a to adjust the third angle θ3 that is formed between the leg support unit 320 and the seating portion 301. In this case, the third angle θ3 is adjusted to be in the range where a toe of the driver D reaches a brake pedal or an accelerator pedal.

The third angle θ3 of the leg angle adjustment unit 321b may be finely adjusted by the driver D. In this case, the seat control system 420 may store a fine adjustment value for each driver D, and adjust the seat device 300 for each driver D at the time of automatic driving. In setting for each driver D, the seat control unit 160 may receive setting information using the HMI 30. Further, the control of the leg angle adjustment unit 321b may be arbitrarily selected by the driver D, or may be operated or released by the driver D performing an operation.

According to the seat control system 420 of the third embodiment described above, it is possible to prevent leg portions of the driver D from being separated from the floor F at the time of adjusting the height of the seating portion 301 at the time of the automatic driving, and to reduce fatigue of the driver D.

Note that, in the first to third embodiments described above, some or all of other embodiments may be combined.

According to the seat vehicle seat control system, the vehicle seat control method, and the vehicle seat control program in the embodiments described above, even in a case that the driver D has caused the seat to enter the reclining state at the time of the automatic driving of the vehicle M, it is possible to secure the field of vision of the driver D.

Although forms for carrying out the present invention have been described above using the embodiments, the present invention is not limited to the embodiments in any way, and various modifications and substitutions may be made without departing from the spirit of the present invention.

What is claimed is:

1. A vehicle seat control system that is mounted on a vehicle, the vehicle seat control system comprising:
   a first backrest portion rotatably connected to a seating portion by a first connection unit;
   a second backrest portion rotatably connected to the first backrest portion by a second connection unit;
   a folding adjustment unit that adjusts an angle of the second connection unit;
   a seat surface adjustment unit that adjusts a height of the seating portion;
   a first angle detection unit that detects a first angle that is formed between the first backrest portion and a floor surface;

a second angle detection unit that detects a second angle that is formed between the second backrest portion and the first backrest portion; and a control unit that controls the folding adjustment unit on the basis of the first angle detected by the first angle detection unit at a time of automatic driving of the vehicle to adjust the second angle, and controls the seat surface adjustment unit to maintain a height of a reference position in the second backrest portion to be equal to or greater than a reference height in a case that the height of the reference position in the second backrest portion is smaller than the reference height.

2. The vehicle seat control system according to claim 1, wherein the reference position of the second backrest portion is a position of an upper end of the second backrest portion, and the reference height is set between the height of the reference position at a time of manual driving and a height of a lower end of a front window of the vehicle.

3. The vehicle seat control system according to claim 1, further comprising:

a rotation angle restriction unit that restricts a rotation angle of the first connection unit, wherein, in a case that a position of an upper end of the second backrest portion is smaller than the reference height at a limit value of an adjustment range of the height of the seat surface adjustment unit, the control unit controls the rotation angle restriction unit to restrict the rotation angle of the first connection unit.

4. The vehicle seat control system according to claim 3, wherein, in a case in which the rotation angle of the first connection unit is increased to exceed a threshold value of a condition that the height of the reference position be smaller than the reference height even in a case that the control unit performs control up to a limit value of a rotation angle of the second backrest portion relative to the first backrest portion and a limit value of an adjustment range of a height of the seat surface adjustment unit, the control unit controls the rotation angle restriction unit to restrict the rotation angle of the first connection unit.

5. The vehicle seat control system according to claim 1, further comprising:

a leg support portion that is rotatably connected to the seating portion by a third connection unit and supports leg portions of an occupant; and a leg support adjustment unit that adjusts a third angle that is formed between the leg support portion and the seating portion, wherein the control unit controls the leg support adjustment unit while interlocking with the control of the seat surface adjustment unit.

6. A method of controlling a vehicle seat including a first backrest portion rotatably connected to a seating portion by a first connection unit, a second backrest portion rotatably connected to the first backrest portion by a second connection unit, a folding adjustment unit that adjusts an angle of the second connection unit, and a seat surface adjustment unit that adjusts a height of the seating portion, the method using an in-vehicle computer, comprising:

detecting, by the in-vehicle computer, a first angle that is formed between the first backrest portion and a floor surface, detecting, by the in-vehicle computer, a second angle that is formed between the second backrest portion and the first backrest portion, and controlling, by the in-vehicle computer, the folding adjustment unit on the basis of the detected first angle at a time of automatic driving of the vehicle to adjust the second angle, and controls the seat surface adjustment unit to maintain a height of a reference position in the second backrest portion to be equal to or greater than a reference height in a case that the height of the reference position in the second backrest portion is smaller than the reference height.

7. A non-transitory computer-readable recording medium recording a program for controlling a vehicle seat including a first backrest portion rotatably connected to a seating portion by a first connection unit, a second backrest portion rotatably connected to the first backrest portion by a second connection unit, a folding adjustment unit that adjusts an angle of the second connection unit, and a seat surface adjustment unit that adjusts a height of the seating portion, the program causing an in-vehicle computer to:

detect, by the in-vehicle computer, a first angle that is formed between the first backrest portion and a floor surface, detect, by the in-vehicle computer, a second angle that is formed between the second backrest portion and the first backrest portion, control, by the in-vehicle computer, the folding adjustment unit on the basis of the detected first angle at a time of automatic driving of the vehicle to adjust the second angle, and control, by the in-vehicle computer, the seat surface adjustment unit to maintain a height of a reference position in the second backrest portion to be equal to or greater than a reference height in a case that the height of the reference position in the second backrest portion is smaller than the reference height.

* * * * *